(12) United States Patent
Yeh et al.

(10) Patent No.: US 11,190,447 B2
(45) Date of Patent: Nov. 30, 2021

(54) ROUTING PROTOCOL AND DISTRIBUTED ROUTER

(71) Applicant: ROCKLEY PHOTONICS LIMITED, Altrincham (GB)

(72) Inventors: Chiang Yeh, Sierra Madre, CA (US); Nathan Farrington, Arcadia, CA (US); Cyriel Minkenberg, Neuheim (CH)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 16/875,886

(22) Filed: May 15, 2020

(65) Prior Publication Data
US 2021/0006495 A1    Jan. 7, 2021

(30) Foreign Application Priority Data
May 16, 2019    (GB) ...................... 1906921

(51) Int. Cl.
*H04L 12/745*    (2013.01)
*H04L 12/721*    (2013.01)
*H04L 29/06*    (2006.01)

(52) U.S. Cl.
CPC .......... *H04L 45/748* (2013.01); *H04L 45/127* (2013.01); *H04L 45/44* (2013.01); *H04L 69/22* (2013.01)

(58) Field of Classification Search
CPC ..... H04L 45/127; H04L 45/44; H04L 45/748; H04L 69/22
See application file for complete search history.

(56) References Cited

U.S. PATENT DOCUMENTS

| | | | |
|---|---|---|---|
| 6,868,086 B1 | 3/2005 | Putzolu et al. | |
| 2002/0118682 A1* | 8/2002 | Choe | H04L 45/00 370/395.31 |

(Continued)

FOREIGN PATENT DOCUMENTS

EP    1 569 388 A1    8/2005

OTHER PUBLICATIONS

Lampson, Butler et al., "IP Lookups Using Multiway and Multicolumn Search", IEEE/ACM Transactions on Networking, Jun. 1999, pp. 324-334, vol. 7, No. 3, IEEE.

(Continued)

*Primary Examiner* — Mansour Oveissi
(74) *Attorney, Agent, or Firm* — Lewis Roca Rothgerber Christie LLP

(57) ABSTRACT

A routing protocol, the routing protocol includes the steps of: receiving a packet at an ingress node of a distributed router, the ingress node having an ingress node address, and the packet having a packet header containing a global destination address; converting the global destination address into a local destination address, the local destination address identifying a location on the distributed router; and routing the packet to the local destination address. A distributed router includes a plurality of internal network nodes, the plurality of internal network nodes including an ingress node configured to receive a packet, the ingress node having an ingress node address, and the packet having a packet header containing a global destination address for that packet; means for converting the global destination address into a local destination address, the local destination address identifying a location on the distributed router; and a routing engine configured to route the packet to the local destination address.

22 Claims, 4 Drawing Sheets

(56) References Cited

U.S. PATENT DOCUMENTS

| | | |
|---|---|---|
| 2009/0303882 A1 | 12/2009 | Tanaka et al. |
| 2011/0134924 A1 | 6/2011 | Hewson et al. |
| 2011/0149963 A1 | 6/2011 | Hamilton et al. |
| 2011/0170553 A1 | 7/2011 | Beecroft et al. |
| 2011/0243134 A1 | 10/2011 | Armstrong et al. |
| 2011/0243146 A1 | 10/2011 | Armstrong et al. |
| 2015/0131664 A1* | 5/2015 | Page .................. H04L 61/2521 370/392 |
| 2017/0041691 A1 | 2/2017 | Rickman et al. |
| 2017/0093717 A1 | 3/2017 | Farrington et al. |
| 2017/0117966 A1 | 4/2017 | Rickman et al. |
| 2017/0245028 A1 | 8/2017 | Rickman et al. |

OTHER PUBLICATIONS

Abts, D., "The Cray XT4 and Seastar 3-D Torus Interconnect", Apr. 6, 2010, 10 pages, ResearchGate.

Alverson, B. et al., "Cray® XC™ Series Network", 2012, pp. 1-28, Cray Inc.

Alverson, R. et al., "The Gemini System Interconnect", 18$^{th}$ IEEE Symposium on High Performance Interconnects, IEEE Computer Society, 2010, pp. 83-87, IEEE.

Arimilli, B. et al., "The PERCS High-Performance Interconnect", 18$^{th}$ IEEE Symposium on High Performance Interconnects, IEEE Computer Society, 2010, pp. 75-82, IEEE.

Chen, D. et al., "The IBM Blue Gene/Q Interconnection Network and Message Unit", 2011, pp. 1-10, ACM.

Minkenberg, C. et al, "Reimagining Datacenter Topologies With Integrated Silicon Photonics", J. Opt. Commun. Netw., Jul. 2018, pp. B126-B139, vol. 10, No. 7, Optical Society of America.

Morgan, T. P., "New Dune Chips Enable Heftier Switches", The Next Platform, Mar. 19, 2015, 10 pages, retrieved at URL: https://www.nextplatform.com/2015/03/19/new-dune-chips-enable-heftier-switches/ on Jan. 14, 2021.

StrataDNX™ Switch Solutions, Broadcom, 1 page, retrieved at URL: https://www.broadcom.com/products/ethernet-connectivity/switching/stratadnx on Nov. 5, 2020.

U.K. Intellectual Property Office Search and Examination Report, dated Oct. 28, 2019, for patent application No. GB1906921.0, 8 pages.

U.K. Intellectual Property Office Examination Report, dated Sep. 29, 2021, for Patent Application No. GB1906921.0, 4 pages.

* cited by examiner

| $x$ | Y | | | | | | | | | | | |
|---|---|---|---|---|---|---|---|---|---|---|---|---|
| 0 | 1 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 |
| 2 | 0 | 0 | 1 | 0 | 0 | 0 | 0 | 0 | 0 | 0 | 0 | 0 |
| ⋮ | | | | | ⋮ | | | | | | | |
| 14 | 0 | 0 | 0 | 0 | 1 | 0 | 0 | 0 | 0 | 0 | 0 | 0 |
| 15 | 0 | 0 | 0 | 0 | 0 | 1 | 0 | 0 | 0 | 0 | 0 | 0 |
| | $Y_{11}$ | $Y_{10}$ | $Y_9$ | $Y_8$ | $Y_7$ | $Y_6$ | $Y_5$ | $Y_4$ | $Y_3$ | $Y_2$ | $Y_1$ | $Y_0$ |

Fig. 3

|  $x$  | Y |
|---|---|
| 0 | 1 1 0 0 0 0 0 0 0 0 0 0 |
| 1 | 0 0 0 0 0 0 0 0 0 0 1 1 |
| 2 | 0 0 1 0 0 0 0 0 0 0 0 0 |
| ⋮ | ⋮ |
| 248,831 | 0 0 0 0 1 0 0 0 0 0 0 0 |

ROUTING PROTOCOL AND DISTRIBUTED ROUTER

CROSS-REFERENCE TO RELATED APPLICATION

The present application claims priority to and the benefit of United Kingdom Application No. GB1906921.0, filed May 16, 2019, the entire content of which is incorporated herein by reference.

FIELD

Embodiments of the present invention are directed towards a routing protocol for routing packets in a network of network nodes, and a distributed router comprising a plurality of internal network nodes.

BACKGROUND

An IP/Ethernet network may include many network nodes (in the form of switches or routers) to interconnect network endpoints, e.g. server nodes. In order to route a packet from a source node to a destination node, an IP lookup or Ethernet routing table lookup is required at each network node. These lookups require complex logic and data structure to parse the packet header and decide to which local output to send the packet based on the passed header fields. This is an inefficient process because it needs to be repeated at every hop, introducing penalties in latency, energy consumption, and resource requirements (e.g. logic and memory).

Some embodiments of the present invention aim to address this problem by considering a collection of network nodes as one large distributed router, rather than a collection of independent routers, and performing routing within that collection of network nodes based on addresses having local relevance only. These addresses can thus be chosen from an address space that is much smaller than the full IP or Ethernet address space, and may hence be amenable for efficient direct-index lookup. IP/Ethernet header parsing needs to occur only once, upon entry into the distributed router, as opposed to at each hop.

SUMMARY

Accordingly, some embodiments of the present invention provide a routing protocol including the steps of: receiving a packet at an ingress internal node of a distributed router, the ingress node having an ingress node address, and the packet having a packet header containing a global destination address for that packet; converting the global destination address into a local destination address, the local destination address identifying a location on the distributed router; and routing the packet to the local destination address. Here, the term "global destination address" refers to an address identifying a location on a whole network, e.g. the entire IP or Ethernet network. This is contrast to "local destination address" which identifies a location on the distributed router. The conversion from a global to a local address means that the routing step need only take place at a level which is local to the distributed router, rather than on a whole-network level.

The routing protocol of some embodiments of the present invention represents one step in the routing of a packet from a source network node to a destination node on a global network, the global network including a plurality of nodes. The distributed router comprises a subset of these network nodes, referred to herein as "internal nodes", or "internal network nodes" in order to clarify which nodes form part of the distributed router. Nodes which form part of the global network, but which are not part of the distributed router may be referred to herein as "external nodes".

Alternatively, the distributed router could be considered to represent a single node in the global network, which itself is made up of many sub-nodes. The term "global" refers to the whole network, whereas the term "local" refers to the distributed router only. The router is "distributed" because the component which performs e.g. the routing lookup is not localized onto a single network node, but rather it is distributed across a plurality of network nodes. By performing the routing lookup at the level of a distributed router made up of a plurality of internal network nodes, the journey of a packet from an ingress port of the distributed router and an egress port of the distributed router, which may take the packet through a plurality of intermediate internal network nodes, is effectively a single hop. This is in contrast to the situation in which a complex routing lookup must be performed when the packet arrives at each successive network node.

In some embodiments of the present invention, the step of converting the global destination address into a local destination address is the most computationally demanding, and it is therefore in some embodiments this step is performed as little as possible. Along the journey of a given packet through the distributed router, the packet may make several intermediate hops, i.e. travel through several internal network nodes on its journey to the location on the distributed router designated by the local destination address. A prime advantage of some embodiments of the invention is that the computationally demanding step of converting the global destination address to a local destination address need only be performed once, i.e. on entry into the distributed router. Thereafter, after each intermediate hop, the only input required is the already-determined local destination address.

The routing protocol of some embodiments of the present invention may be performed by a routing engine. Herein, "routing engine" may refer to computing logic, e.g. in the form of a computer program. In alternative embodiments, the routing engine may be a devoted component. In other embodiments, more than one, or all of the internal network nodes within the distributed router may have a routing engine localized thereon. The routing protocol may be performed at the ingress node.

The local destination address which is derived from the global destination address may include two components: a destination node address, and destination port address. The destination node address designates the internal network node of the distributed router to which the packet should be directed in order eventually to reach its global destination address. The destination port address designates the egress port of the internal node designated by the destination node address from which the packet should exit the distributed router in order to reach its global destination address. Accordingly, the routing protocol may include a step of deriving a destination node address and a destination port address from the local destination address.

The distributed router may include a local control CPU, having a local CPU address. In some embodiments, the distributed router may include a plurality of local control CPUs. For example, there may be one local control CPU per network node. In some cases, a local control CPU may be associated with a plurality of internal network nodes, e.g. a group of network nodes which are physically assembled on the same or physically proximate switch cards. It should be noted that the local control CPU is separate from the routing engine. Packets may be sent to the CPU if e.g. they are directed there, or if the routing engine is unable to identify how they should be processed. In some embodiments, the routing step includes determining whether the destination node address is the local control CPU address. If the destination node address is the local control CPU address, the routing step may further include a step of directing the packet to the local control CPU. Once the packet arrives at the local control CPU, additional processing may be performed on the packet. This further processing is outside the scope of this application.

Throughout this application, the internal network node at which the packet arrives, i.e. the internal network node on which the ingress port is located, may be referred to as the ingress node, having an ingress node address. In embodiments in which the routing protocol is performed at the ingress node, e.g. when the routing engine is located on the ingress node, and optionally in cases where it is determined that the destination node address is not the local control CPU address, the routing step may include determining whether the destination node address is the ingress node address, i.e. that the destination network node is the ingress node.

As discussed, the local destination address may also include a destination port address. The destination port address may be in the form of a logical address. The destination port address may be in the form of an integer value, the value identifying a port on the destination network node. In some embodiments, in addition to identifying a port on the destination network node, the destination port address may also be able to include an integer value indicating that the packet should be forwarded to the local control CPU. In general, it will be appreciated that the destination port address may take more values than there are physical ports on the destination network node, because the port addresses are logical rather than physical addresses.

When it is determined that the destination node address is the ingress node address, the method may further include examining the destination port address. When the destination port address is equal to the value indicating the local control CPU, the method may further include the step of directing the packet to the local control CPU for further processing, as above.

When it is determined that the destination node address is the ingress node address, and that the destination port address does not correspond to the local control CPU, the routing step may further comprise performing a first routing lookup. The first routing lookup may be performed in a physical port table (PPT), using the destination port address as the input. The output of the first routing lookup may identify a set of physical ports on the present network node, i.e. the node which is processing the packet at that time. The identified set of ports may include all of those ports on the destination network node which may serve as egress ports from which the packet may be output in order to reach its local destination node, which ultimately leads to the global destination network node; these ports may be referred to as "eligible" ports. In some embodiments of the present invention, the eligible ports are returned in the form of a bitmap, referred to herein as the eligible physical port bitmap. In some embodiments, the eligible physical port bitmap may include information about the current port status. However, in some embodiments, this status is not considered at this stage. In some embodiments, the EPPB is in the form of a vector, made up of the number of bits as there are ports on the destination network node. An eligible port may be denoted by a "1" and an ineligible port may be denoted with a "0". If all of the ports are denoted "0", this means that there are no ports available which can get the packet to its destination network node. In such cases, the method includes the step of dropping the packet.

The above paragraphs concern the case where the destination network node is the ingress node. Alternatively, it may be determined that the destination network node is not the same as the ingress node. This means, effectively, that the packet may be routed to an intermediate internal node of the distributed router before it is able to be transmitted to the local destination address. As discussed earlier in this application, a prime advantage of some embodiments of the invention lies within the fact that when the packet reaches this intermediate internal node, there is no need to re-calculate the local destination address from the global destination address. So, when it is determined that the destination node is not the same as the ingress node, the routing protocol further includes a step of transmitting the packet to an intermediate internal node, and performing a second routing lookup, wherein: the input of the second routing lookup is the local destination address, and the output from the second routing lookup identifies a set of eligible ports, which are a set of physical ports on the intermediate internal node which are able to serve as egress ports from which the packet may be output in order to reach the local destination node.

In some embodiments in which it is determined that the destination network node is not the same as the ingress node, in order to simplify the second routing lookup, the routing step may further include a step of mapping the destination node address to a smaller index. In some embodiments, the smaller index is an integer value. The step of mapping the destination node address to a smaller index may include calculating an integer value, the calculation being based on the topology of either the global network or the distributed router. Example calculations which may be performed are given later on in this application. This index or integer is referred to as the fabric lookup routing table index, or FLRT index. After the destination node address has been mapped onto an FLRT index, i.e. after a step of calculating an FLRT index based on the destination node address, the routing step may further include a step of performing the second routing lookup in a fabric lookup routing table (FLRT), using the FLRT index as the input. The output from the second routing lookup may be the same as the output from the first routing lookup, i.e. it may be in the form of an EPPB, or any of the other options set out in the previous paragraph, as in the case where the local destination address itself is used as the input to the second routing lookup.

It should be noted that the terms "first" and "second" routing lookup are used as labels only, and should not be construed as meaning that both routing lookups necessarily take place, nor that one is more important than the other, or necessarily takes place before the other.

At this stage in the method, whether or not it is determined that the destination network node is the same as the ingress node, a set of eligible ports has been determined, by one means or another. In some embodiments, this may be in the form of an EPPB, though alternative expressions are envisaged. As discussed, in some embodiments, the EPPB does not take into account the current status of the ports. In those embodiments, the routing step may further include a step of identifying, from the set of eligible physical ports, the subset of physical ports which are available for use. This subset is the set of ports which are e.g. operational, non-faulty etc. In other words, this is set of physical ports from which an egress port may be selected. The set of physical ports which are available for use may be determined based on the status of the set of eligible ports. In some embodiments, the set of available ports may be determined based on a combination of the set of eligible ports, and a physical port status bitmap (PPSB). The PPSB may be a vector having the same dimension as the EPPB, the PPSB representing the status of each physical port. In some embodiments, the component of the vector representing a given port is 1 for a properly-functioning port, and 0 for a non-functioning port. The set of available ports may be represented in the form of a physical port bitmap (PPB). If all of the components of the PPB are equal to zero, none of the eligible ports are functioning properly, and accordingly the packet is dropped.

Otherwise, the PPB or equivalent feature represents the set of egress ports from which the packet may be output in order to approach its global destination address, and which are properly-functioning and available for use. The routing step may further include a step of selecting a port from the set of egress ports. The routing protocol may further include a step of outputting the packet from the selected egress port.

A packet which is being transferred from a source client device to a destination device may pass through a number of intermediate network nodes. As discussed, an important advantage of some embodiments of the present invention is that the computationally demanding initial lookup (i.e. to convert the global destination address to the local destination address) need only be performed once, when the packet arrives at the ingress node. However, the routing protocol of some embodiments of the present invention does not only take place at the ingress node; when the packet has to travel through one or more intermediate nodes, the routing protocol may be performed at each intermediate node.

Accordingly, a second aspect of some embodiments of the present invention provides a routing protocol including the steps of: receiving a packet at an internal node of a distributed router, the internal node having an internal node address, and the packet having a packet header containing a local destination address, the local destination address identifying a location on the distributed router; and routing the packet to the local destination address. In some embodiments, in line with the first aspect of some embodiments of the invention, a global destination address is converted to the local destination address at an ingress node of the distributed router. Effectively, the protocol according to the second aspect of some embodiments of the invention defines the steps that take place at an intermediate node, rather than an ingress node. Embodiments of the second aspect of some embodiments of the invention may include the same optional features which have been presented above, with reference to the first aspect of some embodiments of the invention, where compatible. The skilled person is well-aware which optional features are compatible.

A third aspect of some embodiments of the invention sets out explicitly the operations taking place at both the ingress node and an intermediate node. Accordingly, it provides a routing protocol including the steps of:

(a) receiving a packet at an ingress internal node of a distributed router, the ingress node having an ingress node address, and the packet having a packet header containing a global destination address;

(b) converting the global destination address to a local destination address, the local destination address identifying a location on the distributed router, the local destination address including a destination node address corresponding to a destination network node on the distributed router;

(c) determining a first set of eligible ports on the ingress node which are able to serve as egress ports from which the packet may be output in order to reach the destination network node;

(d) outputting the packet from one of the eligible ports to an intermediate network node of the distributed router;

(e) receiving the packet at the intermediate network node; and determining, based on the local destination address, a second set of eligible ports on the intermediate network node which are able to serve as egress ports from which the packet may be output in order to reach the destination network node.

In some embodiments, between steps (d) and (e), the method may further include a step of determining whether the intermediate network node is the destination network node. If not, the intermediate network node may be referred to as a first intermediate network node, and the method may include a further step (f), of outputting the packet from one of the eligible ports to a second intermediate network node. Thereafter, the determining step and outputting step (i.e. to a third intermediate network node and so on) until it is determined that a given intermediate network node is the destination network node. In other words, the process of determining whether a given intermediate network node is the destination network node, and if not, outputting the packet to a further intermediate network node, repeats until the packet arrives at its ultimate destination network node, wherein in each case, the set of eligible ports is determined only from the local destination address and not the global destination address, in order to save computing time.

A fourth aspect of some embodiments of the present invention provides a distributed router including a plurality of internal network nodes, the plurality of internal network nodes including an ingress node configured to receive a packet, the packet having a packet header containing a global destination address for that packet, means for converting the global destination address into a local destination address, the local destination address identifying a location on the distributed router; and a routing engine configured to route the packet to the local destination address. In an IP network, the means for converting the global destination address into a local destination address may be a longest prefix matching (LPM) component. In other embodiments, the global destination address may be converted into a local destination address using methods described in US 2017/0093717 A1, which is incorporated herein by reference. The means for converting the global destination address into a local destination address may be located on the ingress node.

In some embodiments of some embodiments of the present invention, the internal network nodes may be implemented in the form of a chip such as an application specific integrated circuit (ASIC).

The optional features set out above with reference to the first aspect of some embodiments of the invention apply equally well to the third aspect of the invention.

Further optional features of some embodiments of the invention are set out below.

BRIEF DESCRIPTION OF THE DRAWINGS

The present invention will now be described with reference to the accompanying drawings, in which:

FIG. 3 shows an example of a physical port table (PPT).

FIG. 4 shows an example of a fabric lookup routing table (FLRT).

DETAILED DESCRIPTION OF THE DRAWINGS

Figure 1:
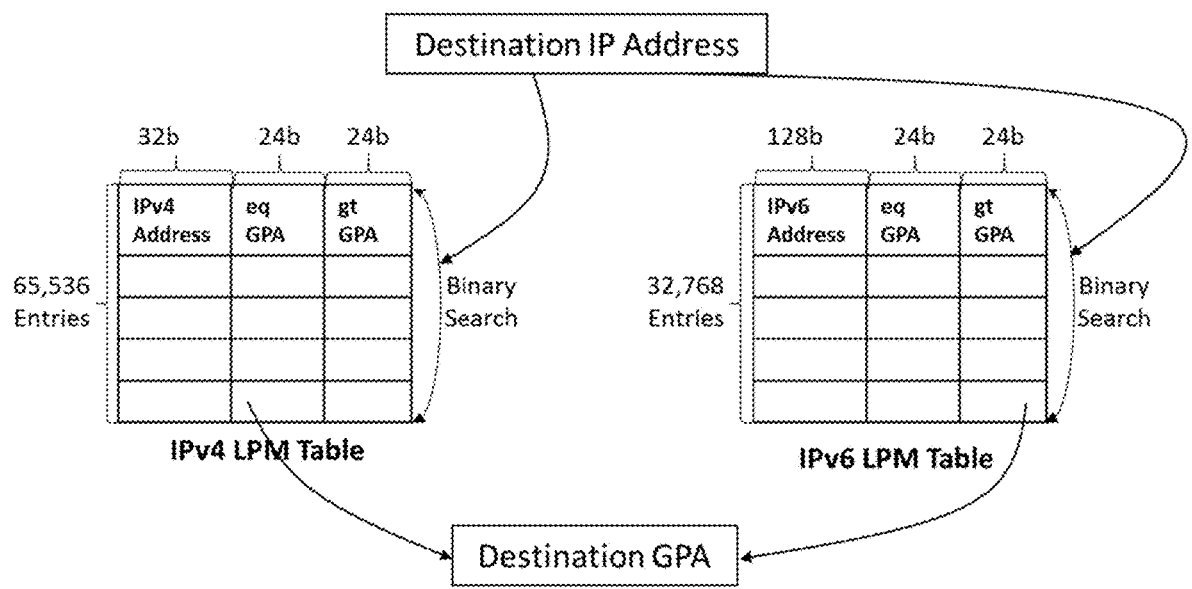
FIG. 1 shows a longest prefix matching process.

Before the routing protocol of some embodiments of the present invention takes place, it is necessary to identify a network node on the distributed router to which a packet may be directed in order to continue its path to its ultimate destination on the IP/Ethernet network. An incoming packet generally has an IP/Ethernet packet header including information about the ultimate destination of the packet within the network. Before the routing protocol takes place, a protocol header which includes a global port address is inserted into this packet. In specific embodiments the routing lookup is performed using longest prefix matching, a process by which an IPv4 of IPv6 destination address is received and a global port address is returned. More detail about longest prefix matching may be found in Lampson et al. (1999)[1]. This process is illustrated in FIG. 1. An alternative means by which a LPA may be obtained is set out in US 2017/0093717 A1, which is incorporated herein by reference. In this document, the source routing approach is based on a stack of multiprotocol label switching (MPLS) headers. The LPA may be encoded directly in the label or by indexing a different table mapping MPLS labels to LPAs.

Figure 2:
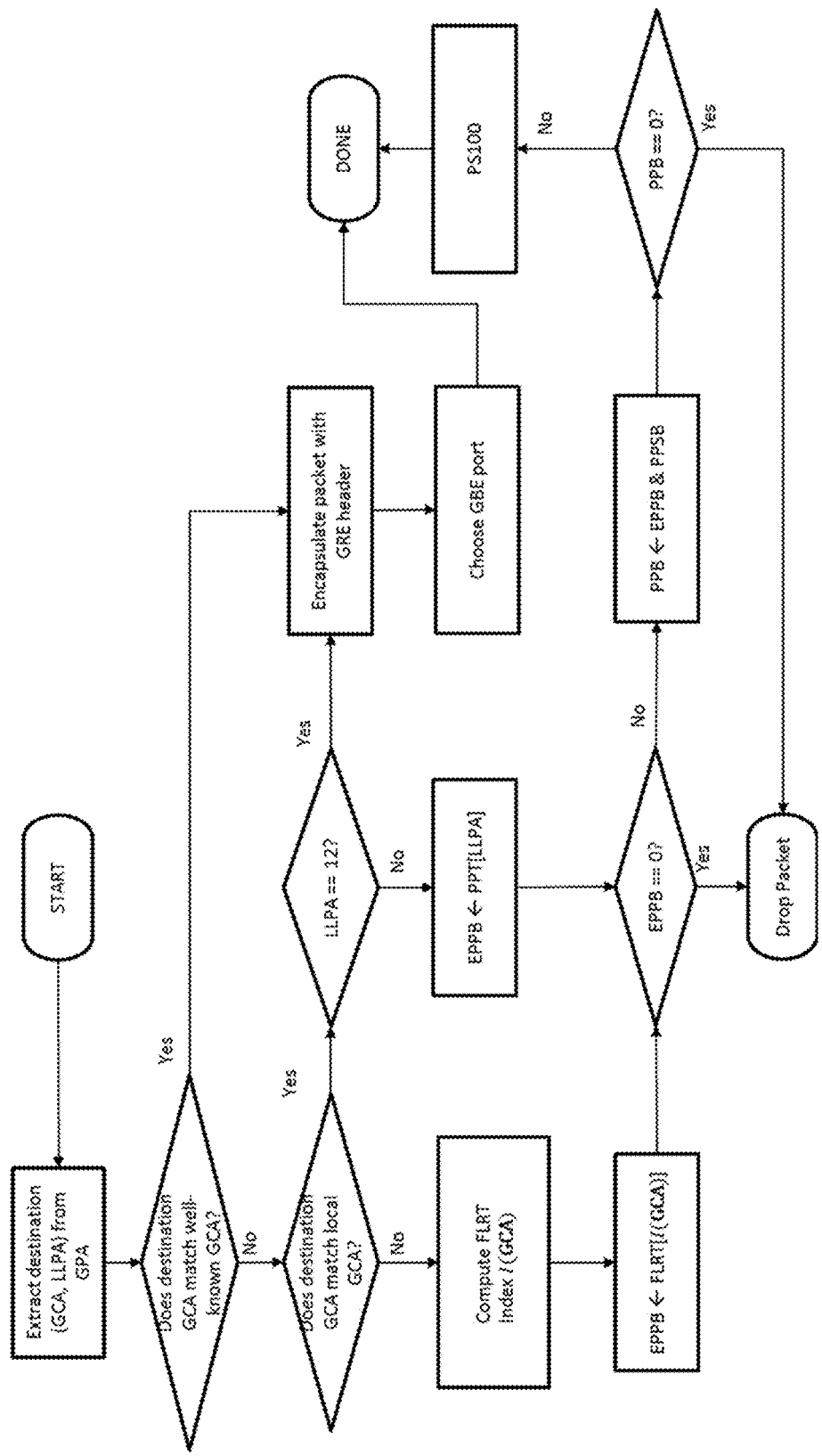
FIG. 2 shows a flowchart representing the routing protocol of an embodiment of the present invention.

The routing protocol of some embodiments of the present invention is shown in FIG. 2, and will now be described in depth. In broad terms, the routing engine, i.e. the computing logic which is configured to perform the protocol of some embodiments of the present invention, takes as its input a destination local port address ("LPA"). In some embodiments, this is a 24-bit address comprised of a local chip address ("LCA") and a local logical port address ("LLPA"). From this, the output of the routing protocol is one of three options: either a packet is dropped ("DROP"), the packet is forwarded to the CPU ("FORWARD_TO_CPU"), or a physical port bitmap ("PPB"):

DROP: This means that for some reason the packet cannot be directed to its destination address, e.g. because the port in question is inactive.

FORWARD_TO_CPU: This may mean that the packet is actually destined for the local control CPU, or that the routing engine is unable to determine how exactly the packet should be process, and therefore delegates responsibility.

PPB: This is the most common case. It means that the routing engine has successfully formed a routing lookup, which results in a set of eligible ports of the network node to which the packet may be routed.

In a first step, a destination LCA and LLPA are extracted from the LPA. The LCA represents an address which is local to the distributed router.

In a first step, the routing engine determines whether the LCA is a "well-known" LCA. In the present scheme, the "well-known LCA" is a mechanism for explicitly addressing a packet to the control CPU of a given network node. In the event that it is determined that the LCA is a well-known LCA, then the FORWARD_TO_CPU action is returned. In FIG. 1, this may be done by encapsulating the packet with a generic routing encapsulation ("GRE") header. Then, a port which connects the network node to the control CPU is selected. This may be a gigabit Ethernet ("GBE") port.
[1] Butler Lampson, Venkatachary Srinivasan, and George Varghese, "IP lookups using multiway and multicolumn search," IEEE/ACM Transactions on Networking (1999): 324-334, http://cseweb.ucsd.edu/~varghese/PAPERS/ToN99.pdf In a next step, the routing engine determines whether the destination LCA matches the LCA of the routing engine itself. If it is, the routing engine then determines whether the LLPA is equal to a predetermined value not corresponding to any regular output port. In the present scheme, this is an LLPA which is used to express that the destination of the packet is the local control CPU, and accordingly, if so, the steps of encapsulating the packet with a GRE header, and selecting a control port, such as a GBE port take place as set out in the previous paragraph. If the LLPA does not indicate the local control CPU, then the LLPA is input into a physical port table ("PPT") in order to determine an eligible physical port bitmap ("EPPB"). In the present embodiment, the EPPB is a 12-bit vector resulting from the PPT (or FLRT index) which indicates the set of data ports that are eligible as next hop ports, without taking the current port status into account. The port is eligible if and only if EPPB(i)=1. If the EPPB is equal to zero, DROP is returned because it means that the destination network node is in a different network partition.

An example of a PPT is shown in FIG. 3, in which the input LLPA is interpreted as an integer index into the PPT. Y is the value (comprising R bits) stored at table index x. Multiple bits may be set to 1 indicating that for routing purposes, these ports may be considered equivalent. In FIG. 3, the following is true:

$$0 \leq x < R$$

$$Y = \langle Y_{R-1}, \ldots, Y_1, Y_0 \rangle$$

$Y_i=1$, if LLPA x is an alias for a physical port i.

In the example shown in FIG. 2, the required memory is 16 entries of R=12 bits, i.e. 192 bits in total. Mathematically, it may be written that Y=PPT(x). This may also be used for link bundles and aggregation groups. Once the EPPB has been determined using the PPT, its value is determined by the routing engine. If the EPPB is equal to zero, this means that no port is eligible, i.e. there is no known path to the destination LCA. When this is the case, the packet is dropped.

When the EPPB is not equal to zero, the physical port bitmap ("PPB") is determined. In the present embodiment, the 12-bit PPB represents the set of physical 100 GbE ports from which the next hop may be selected. The PPB is the result of a bitwise logical AND operation between the EPPB and a further bitmap, the physical port status bitmap ("PPSB"). This is a 12-bit vector which represents the physical status of each 100 GbE port. The status reflects whether or not the port is functioning properly, i.e. whether the link is up and is carrying traffic in both directions without errors. A physical port is functioning if PPSB[i]=1. The PPSB is updated in hardware: when the SERDES detects a loss of signal/lock, or the FEC error count exceeds a threshold, then the PPSB bit for this port is cleared to 0.

If the destination LCA does not match the LCA of the routing engine, the destination LCA is mapped to a smaller integer called the fabric lookup routing table ("FLRT"). The FLRT is calculated differently for different topologies. For the well-known folded Clos topology, the global chip address may take the form:

$$(x_{L-1}, \ldots, x_1, x_0)$$

And the FLRT index:

$$I(x) = \sum_{i}^{L-2} (x_i \cdot W_i)$$

Where:

$$W_i = \prod_{j=0}^{i-2} m_{j+2}$$

In which $m_j$ is the downward branching factor at tier j. It should be noted that the tier index $x_{L-1}$ does not appear in the computation because we only need to route to leaf switch modules.

In the RPFabric topology, exemplified in US 2017/0041691 A1, US 2017/0245028 A1, and US 2017/0117966 A1, the FLRT index may be calculated differently:

$$I(x) = \sum_{i=0}^{L-1} (x_i \cdot W_i)$$

$W_i$ is calculated slightly differently:

$$W_i = \prod_{i=0}^{L-1} (x_i \cdot R^i)$$

In which $R_i$ is the number of chips in dimension i. If $R^i=R$ for all values of i, then:

$$I(x) = \sum_{i=0}^{L-1} (x_i \cdot R^i)$$

Once the FLRT index has been determined, it is mapped onto an EPPB using the fabric lookup routing table FLRT. An example of an FLRT is shown in FIG. 4, in which:

0≤x<N−1, where N represents the total number of FLRT entries (i.e. the size of the table in number of rows).

$$Y = \langle Y_{R-1}, \ldots, Y_1, Y_0 \rangle$$

$Y_i=1$, if physical port i is eligible for routing towards LCA x.

Once an EPPB is determined using an FLRT index and the FLRT, the PPB is determined using the PPSB as before.

The invention claimed is:

1. A routing protocol, the routing protocol including the steps of:
receiving a packet at an ingress internal node of a distributed router, the ingress internal node having an ingress node address, and the packet having a packet header containing a global destination address;
converting the global destination address into a local destination address, the local destination address identifying a location on the distributed router; and
routing the packet to the local destination address, wherein:
the local destination address includes a destination node address corresponding to a destination network node located on the distributed router, and a destination port address corresponding to a port located on the destination network node;
the distributed router includes a local control CPU having a local control CPU address;
the routing step includes determining whether the destination node address is the local control CPU address; and
when it is determined that the destination node address is the local control CPU address, the routing step includes a step of directing the packet to the local control CPU.

2. The routing protocol according to claim 1, wherein:
longest prefix matching is used to convert the global destination address to the local destination address.

3. The routing protocol according to claim 1, wherein:
the routing step includes determining whether the destination node address is the ingress node address.

4. The routing protocol according to claim 3, wherein:
when it is determined that the destination node address is the ingress node address, and that the destination node address is not the local control CPU address, the routing step includes performing a first routing lookup, wherein:
an input of the first routing lookup includes the destination port address; and
an output of the first routing lookup identifies a set of eligible ports, which are a set of physical ports on the ingress internal node which are able to serve as egress ports from which the packet may be output in order to reach a local destination node.

5. The routing protocol according to claim 4, wherein:
the eligible ports are returned in the form of an eligible port bitmap.

6. The routing protocol according to claim 5, wherein:
the routing step further includes a step of identifying, from the set of eligible ports, a subset of eligible physical ports which are available for use, based on a status of the set of eligible ports.

7. The routing protocol according to claim 3, wherein:
when it is determined that the destination node address is not the ingress node address, the routing step includes determining a set of eligible ports on the ingress internal node which are able to serve as egress ports from which the packet may be output in order to reach the destination network node.

8. The routing protocol according to claim 3, wherein:
when it is determined that the destination node address is not the same as the ingress internal node address, the routing step further includes a step of transmitting the packet to an intermediate internal node, and performing a second routing lookup, wherein:
an input of the second routing lookup is the local destination address, and
an output from the second routing lookup identifies a set of eligible ports, which are a set of physical ports on the intermediate internal node which are able to serve as egress ports from which the packet may be output in order to reach a local destination node.

9. The routing protocol according to claim 3, wherein:
when it is determined that the destination node address is not the ingress node address, the routing step includes mapping the destination node address to a smaller index;

the routing step further includes performing a second routing lookup in a fabric lookup routing table, wherein:
an input of the second routing lookup is the smaller index; and
an output from the second routing lookup identifies a set of eligible ports, which are a set of physical ports on the ingress internal node which are able to serve as egress ports from which the packet may be output in order to reach a local destination node.

10. The routing protocol according to claim 1, further including the steps of:
determining a first set of eligible ports on the ingress internal node which are able to serve as egress ports from which the packet may be output in order to reach the destination network node;
outputting the packet from one of the eligible ports from the first set of eligible ports to an intermediate network node of the distributed router;
receiving the packet at the intermediate network node; and
determining, based on the local destination address, a second set of eligible ports on the intermediate network node which are able to serve as egress ports from which the packet may be output in order to reach the destination network node.

11. The routing protocol according to claim 10, wherein:
the routing protocol further includes a step of determining whether the intermediate network node is the destination network node.

12. The routing protocol according to claim 11, wherein:
if the intermediate network node is not the destination network node, the intermediate network node is a first intermediate network node, and the routing protocol further includes a step of outputting the packet from one of the second set of eligible ports on the first intermediate network node to a second intermediate network node.

13. A distributed router including:
a plurality of internal network nodes, the plurality of internal network nodes including an ingress node configured to receive a packet, the ingress node having an ingress node address, and the packet having a packet header containing a global destination address for that packet;
means for converting the global destination address into a local destination address, the local destination address identifying a location on the distributed router; and
a routing engine configured to route the packet to the local destination address,
wherein:
the local destination address includes a destination node address corresponding to a destination network node located on the distributed router, and a destination port address corresponding to a port located on the destination network node;
the distributed router includes a local control CPU, having a local control CPU address;
the routing engine is configured to determine whether the destination node address is the local control CPU address; and
when it is determined that the destination node address is the local control CPU address, the routing engine is configured to direct the packet to the local control CPU.

14. The distributed router according to claim 13, wherein:
the means for converting the global destination address into the local destination address is configured to use longest prefix matching to do so.

15. The distributed router according to claim 13, wherein:
when it is determined that the destination node address is the ingress node address, and that the destination node address is not the local control CPU address, the routing engine is configured to perform a first routing lookup, wherein:
an input of the first routing lookup includes the destination port address, and
an output of the first routing lookup identifies a set of eligible ports, which are a set of physical ports on the ingress node which are able to serve as egress ports from which the packet may be output in order to reach a local destination node.

16. A distributed router including:
a plurality of internal network nodes, the plurality of internal network nodes including an ingress node configured to receive a packet, the ingress node having an ingress node address, and the packet having a packet header containing a global destination address for that packet;
means for converting the global destination address into a local destination address, the local destination address identifying a location on the distributed router; and
a routing engine configured to route the packet to the local destination address,
wherein:
the local destination address includes a destination node address corresponding to a destination network node located on the distributed router, and a destination port address corresponding to a port located on the destination network node; and
the routing engine is configured to determine whether the destination node address is the ingress node address.

17. The distributed router according to claim 16, wherein:
when it is determined that the destination node address is not in the ingress node address, the routing engine is configured to determine a set of eligible ports on the ingress node which are able to serve as egress ports from which the packet may be output in order to reach the destination network node.

18. The distributed router according to claim 16, wherein:
when it is determined that the destination node address is not the same as the ingress node address, the routing engine is configured to transmit the packet to an intermediate internal node, and to perform a second routing lookup, wherein:
an input of the second routing lookup is the local destination address, and
an output from the second routing lookup identifies a set of eligible ports, which are a set of physical ports on the intermediate internal node which are able to serve as egress ports from which the packet may be output in order to reach a local destination node.

19. The distributed router according to claim 16, wherein:
when it is determined that the destination node address is not the ingress node address, the routing engine is configured to map the destination node address to a smaller index; and
the routing engine is further configured to perform a second routing lookup in a fabric lookup routing table, wherein:

an input of the second routing lookup is the smaller index, and an output from the second routing lookup identifies a set of eligible ports, which are a set of physical ports on the ingress node which are able to serve as egress ports from which the packet may be output in order to reach a local destination node.

20. The distributed router according to claim 19, wherein: the eligible ports are returned in the form of an eligible physical port bitmap.

21. The distributed router according to claim 20, wherein: the routing engine is further configured to identify, from the set of eligible ports, a subset of eligible physical ports which are available for use, based on a status of the set of eligible ports.

22. The distributed router according to claim 16, wherein: the means for converting the global destination address into the local destination address is configured to use longest prefix matching to do so.

* * * * *